United States Patent
Tada et al.

(10) Patent No.: US 11,904,835 B2
(45) Date of Patent: Feb. 20, 2024

(54) HYBRID VEHICLE AND ELECTRIC VEHICLE

(71) Applicant: KAWASAKI MOTORS, LTD., Akashi (JP)

(72) Inventors: Tomoki Tada, Akashi (JP); Shohei Terai, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 180 days.

(21) Appl. No.: 17/456,845

(22) Filed: Nov. 29, 2021

(65) Prior Publication Data
US 2022/0194357 A1 Jun. 23, 2022

(30) Foreign Application Priority Data
Dec. 23, 2020 (JP) .................. 2020-213174

(51) Int. Cl.
*B60W 20/15* (2016.01)
*B60W 20/40* (2016.01)

(52) U.S. Cl.
CPC ............ *B60W 20/15* (2016.01); *B60W 20/40* (2013.01); *B60Y 2200/91* (2013.01); *B60Y 2200/92* (2013.01)

(58) Field of Classification Search
CPC ...... B60W 20/15; B60W 20/40; B60W 20/20; B60W 2300/362; B60W 2300/367; B60W 2300/36; B60W 2710/248; B60W 2510/246; B60W 10/06; B60W 10/08; B60W 10/26; B60W 30/192; B60Y 2200/91; B60Y 2200/92; B60K 6/387;
(Continued)

(56) References Cited

U.S. PATENT DOCUMENTS 6,823,840 B1 * 11/2004 Tamai ............... B60K 6/48
123/355
2013/0184919 A1 7/2013 Kabe
(Continued)

FOREIGN PATENT DOCUMENTS

JP 3470681 B2 11/2003
JP 2017140869 A 8/2017
(Continued)

*Primary Examiner* — George C Jin
(74) *Attorney, Agent, or Firm* — Alleman Hall & Tuttle LLP

(57) ABSTRACT

A hybrid vehicle includes: a driving power source including an engine and an electric motor; a battery that supplies electric power to the electric motor; and a controller that controls the engine and the electric motor according to a temperature of the battery. When a predetermined EV mode condition is satisfied, and a normal-temperature condition in which the temperature of the battery is a threshold or more is satisfied, the controller controls the driving power source in an EV mode in which the electric motor is driven. When the EV mode condition is satisfied, and a low-temperature condition in which the temperature of the battery is less than the threshold is satisfied, the controller operates the electric motor in a state where electric current flows between the battery and the electric motor drives the engine such that the engine generates traveling power transmitted to a driving wheel.

14 Claims, 6 Drawing Sheets

(58) Field of Classification Search
CPC ... B60K 6/48; B60K 6/547; B60K 2006/4825
See application file for complete search history.

(56) References Cited

U.S. PATENT DOCUMENTS

| | | | |
|---|---|---|---|
| 2015/0321573 A1* | 11/2015 | Sato | B60W 10/08 |
| | | | 903/903 |
| 2017/0096136 A1* | 4/2017 | Nawata | B60W 10/08 |
| 2019/0263252 A1* | 8/2019 | Hettrich | B60L 3/00 |
| 2019/0263379 A1* | 8/2019 | Chikkannanavar | B60W 10/08 |
| 2019/0283730 A1 | 9/2019 | Ota et al. | |
| 2020/0269724 A1* | 8/2020 | Takazawa | B60K 11/02 |

FOREIGN PATENT DOCUMENTS

| | | | |
|---|---|---|---|
| JP | 2019162930 A | 9/2019 | |
| JP | 2020174458 A | 10/2020 | |
| WO | 2012053593 A1 | 4/2012 | |

* cited by examiner

HYBRID VEHICLE AND ELECTRIC VEHICLE

CROSS-REFERENCE TO RELATED APPLICATION

This application claims priority to and the benefit of Japanese Patent Application No. 2020-213174 filed on Dec. 23, 2020 with the Japan Patent Office, the entire disclosure of which is incorporated herein by reference.

BACKGROUND OF THE INVENTION

Field of the Invention

The present disclosure relates to a hybrid vehicle and an electric vehicle each of which includes an electric motor as a driving power source, the electric motor being driven by electric power of a battery.

Description of the Related Art

A hybrid vehicle including a driving power source including an engine and an electric motor is known (see Japanese Patent Publication No. 3470681, for example).

At the time of cold start in which the hybrid vehicle is started under a low-temperature environment, the temperature of a battery is low, and therefore, a discharge characteristic of the battery is low. On this account, at the time of the cold start, the output of the electric motor is limited, and with this, driving feeling at an initial stage of traveling deteriorates.

SUMMARY OF THE INVENTION

A hybrid vehicle according to one aspect of the present disclosure includes: a driving power source including an engine and an electric motor; a battery that supplies electric power to the electric motor; and a controller that controls the engine and the electric motor in accordance with a temperature of the battery. When a predetermined EV mode condition is satisfied, and a normal-temperature condition that the temperature of the battery is a threshold or more is satisfied, the controller controls the driving power source in an EV mode in which the electric motor is driven. When the EV mode condition is satisfied, and a low-temperature condition that the temperature of the battery is less than the threshold is satisfied, the controller controls the driving power source so as to operate the electric motor in a state where electric current flows between the battery and the electric motor and so as to drive the engine such that the engine generates traveling power transmitted to a driving wheel.

According to the above configuration, at the time of the cold start, while generating adequate traveling driving power by the driving of the engine, the temperature of the battery can be increased by charging or discharging of the battery by the operation of the electric motor, and this can promote the recovery of the discharge characteristic of the battery. Therefore, even at the time of the cold start, the state of the battery can be quickly changed to the normal-temperature state while suppressing a deterioration of driving feeling.

An electric vehicle according to another aspect of the present disclosure includes: a driving power source including an electric motor; a battery that supplies electric power to the electric motor; a temperature sensor that detects a temperature of the battery; a heater that generates heat by the electric power from the battery to heat the battery; a switch that switches a circuit between an energized state and a non-energized state, the circuit connecting the battery to the heater; and a switch driver that drives the switch such that the circuit is set to the energized state when the temperature of the battery is less than a threshold.

According to the above configuration, at the time of the cold start, the battery is heated by the heater, and at the same time, self-heating of the battery is performed by the electric power supply to the heater. With this, the temperature of the battery is effectively increased. Therefore, the discharge characteristic of the battery can be quickly recovered at the time of the cold start, and the driving power of the electric motor can be increased.

DESCRIPTION OF THE PREFERRED EMBODIMENTS

Hereinafter, an embodiment will be described with reference to the drawings.

Figure 1:
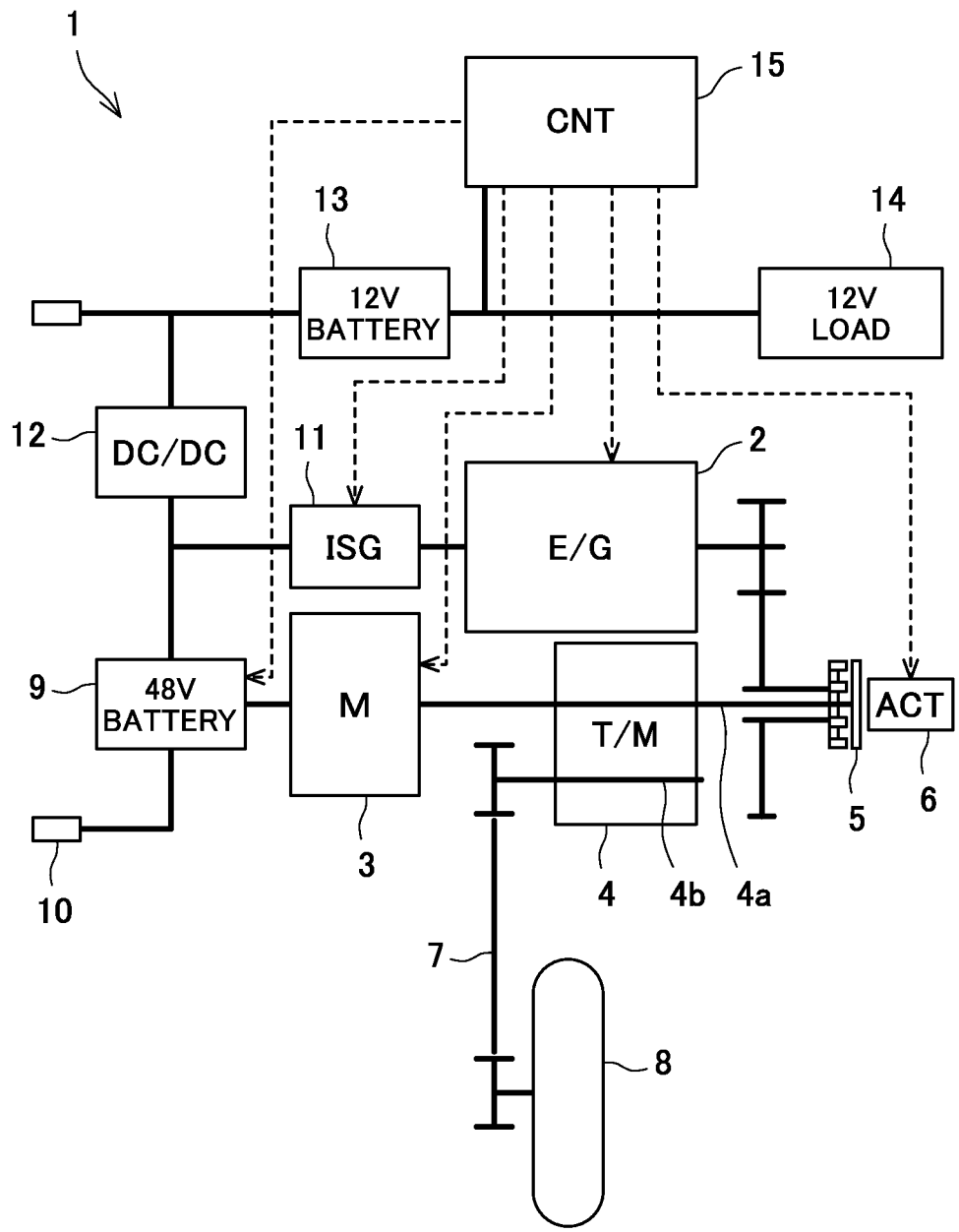
FIG. 1 is a block diagram of a hybrid vehicle according to an embodiment.

FIG. 1 is a block diagram of a hybrid vehicle 1 according to the embodiment. The hybrid vehicle 1 is, for example, a straddle vehicle (such as a motorcycle or an automatic three-wheeled vehicle) straddled by a rider, but may be an automatic four-wheeled vehicle or the like. As shown in FIG. 1, the hybrid vehicle 1 includes an engine 2, an electric motor 3, a transmission 4, a main clutch 5, a clutch actuator 6, an output transmitting structure 7, a driving wheel 8, a first battery device 9, a charging port 10, an ISG 11, a converter 12, a second battery device 13, and a controller 15.

The engine 2 is an internal combustion engine. The engine 2 is a driving power source that drives the driving wheel 8. The electric motor 3 is a driving power source that drives the driving wheel 8 together with or instead of the engine 2. The electric motor 3 also serves as an electric power generator. The transmission 4 changes the speed of rotational power output from the engine 2 and the electric motor 3. The transmission 4 is, for example, a manual transmission including an input shaft 4a, an output shaft 4b, and a speed change gear.

The main clutch 5 is interposed on a power transmission path between the engine 2 and the transmission 4. The clutch actuator 6 operates the main clutch 5 such that the main clutch 5 is switched between an engaged state and a disengaged state. The output transmitting structure 7 is a structure through which rotational power output from the output shaft 4b of the transmission 4 is transmitted to the driving wheel 8. The output transmitting structure 7 is, for example, a drive chain, a drive belt, or a drive shaft. The driving wheel 8 is, for example, a rear wheel of the hybrid vehicle 1.

The first battery device 9 stores electric power (for example, 48V) to be supplied to the electric motor 3. The charging port 10 is connected to the first battery device 9. The first battery device 9 is arranged in a non-sealed space of the hybrid vehicle 1. The first battery device 9 may be arranged so as to be exposed to an outside or may be covered with a cowl. To be specific, when the hybrid vehicle 1 is parked under a low-temperature environment, the first battery device 9 is easily cooled by outside air. The ISG 11 is an integrated starter generator. The ISG 11 can drive the engine 2 at the start of the engine 2 and can be driven by the engine 2 to generate electric power. The converter 12 lowers the voltage of DC power (for example, 48V) supplied from the first battery device 9 and the ISG 11 and supplies the power to the second battery device 13. The second battery device 13 stores electric power (for example, 12V) to be supplied to the controller 15 and an electric component 14 mounted on the hybrid vehicle 1. The first battery device 9 outputs voltage higher than voltage output from the second battery device 13.

The controller 15 controls the engine 2, the electric motor 3, the clutch actuator 6, the first battery device 9, and the ISG 11 based on information detected by various sensors. The controller 15 may be a single controller or may be constituted by controllers arranged in a distributed manner. The controller 15 determines a driving mode of the hybrid vehicle 1 and controls the engine 2 and the electric motor 3 in accordance with the determined driving mode.

Examples of the driving mode include an EV mode, an HEV mode, and an EG mode. The EV mode is a mode in which: 100% of requested torque is distributed to the electric motor 3; and the traveling is performed by driving the electric motor 3. In the EV mode, the engine 2 is in a stop state or in a state where although the engine 2 is driving, the power generated by the engine 2 is not transmitted to the driving wheel 8. The HEV mode is a mode in which: the requested torque is distributed to the engine 2 and the electric motor 3; and the traveling is performed by driving both the engine 2 and the electric motor 3. To be specific, in the HEV mode, in a state where electric current flows between a battery 21 and the electric motor 3, the electric motor 3 operates, and the engine 2 drives. The HEV mode may be a mode in which the main clutch 5 becomes the engaged state with the engine 2 driving.

The EG mode is a mode in which: 100% of the requested torque is distributed to the engine 2; and the traveling is performed by driving the engine 2 without driving the electric motor 3. Switching between the HEV mode and the EG mode may be controlled by an inverter 3a (see FIG. 3) of the electric motor 3. A power generation mode may be executed by setting the transmission 4 to a neutral position and driving the electric motor 3 by the power of the engine 2.

Figure 2:
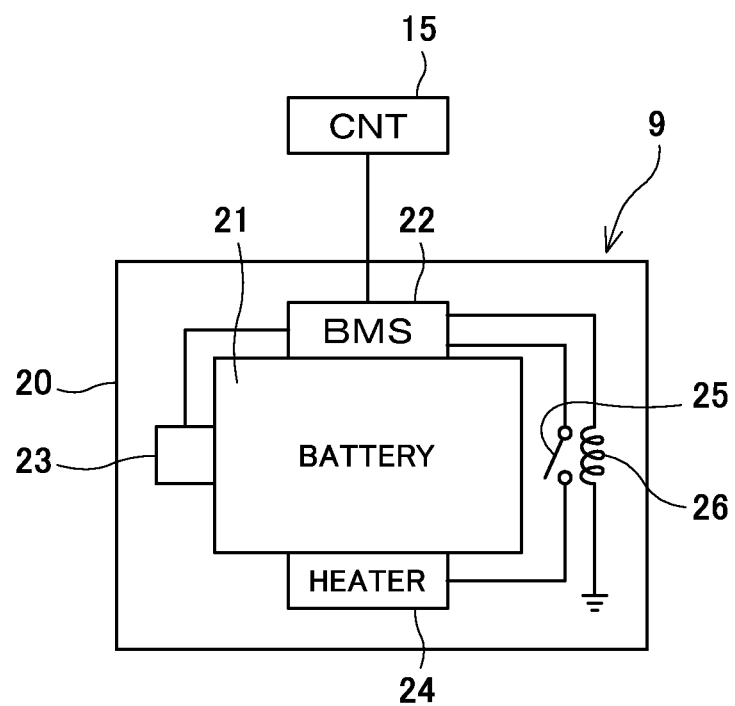
FIG. 2 is a schematic diagram of a first battery device of FIG. 1.

FIG. 2 is a schematic diagram of the first battery device 9 of FIG. 1. As shown in FIG. 2, the first battery device 9 includes a housing 20, the battery 21, a BMS 22 (battery management system), a temperature sensor 23, a heater 24, a switch 25, and a switch driver 26. The housing 20 accommodates the battery 21, the BMS 22, the temperature sensor 23, the heater 24, the switch 25, and the switch driver 26. The BMS 22 is a battery controller that controls charging and discharging of the battery 21.

The temperature sensor 23 directly or indirectly detects the temperature of the battery 21 (hereinafter, the temperature of the battery 21 may be simply referred to as a "battery temperature"). A detection signal of the temperature sensor 23 is received by the controller 15 through the BMS 22. The controller 15 may directly receive the detection signal from the temperature sensor 23. The temperature sensor 23 is attached to the battery 21 but may be attached to the housing 20. The temperature sensor 23 may be in contact with the battery 21 or may be located away from the battery 21.

When electric current flows through the heater 24, the heater 24 generates Joule heat. The heater 24 generates heat by electric power from the battery 21 to heat the battery 21. To be specific, the heater 24 itself becomes a heat generating body to heat the battery 21. The heater 24 is attached to the battery 21. The heater 24 may be in contact with the battery 21 or may be located away from the battery 21. The heater 24 may generate hot air instead of the above configuration.

The switch 25 switches a circuit between an energized state (on state) and a non-energized state (off state), the circuit connecting the battery 21 to the heater 24. When the battery temperature is less than a threshold $T_1$, the switch driver 26 drives the switch 25 such that the circuit between the battery 21 and the heater 24 becomes the energized state. The switch driver 26 is, for example, a coil that generates magnetic force by electric power from the battery 21 to drive the switch 25. Energization and non-energization of the switch driver 26 may be controlled by the BMS 22 or the controller 15. The switch 25 is a normally-open switch that becomes an open state when the switch driver 26 is in a non-driving state (non-energized state).

Figure 3:
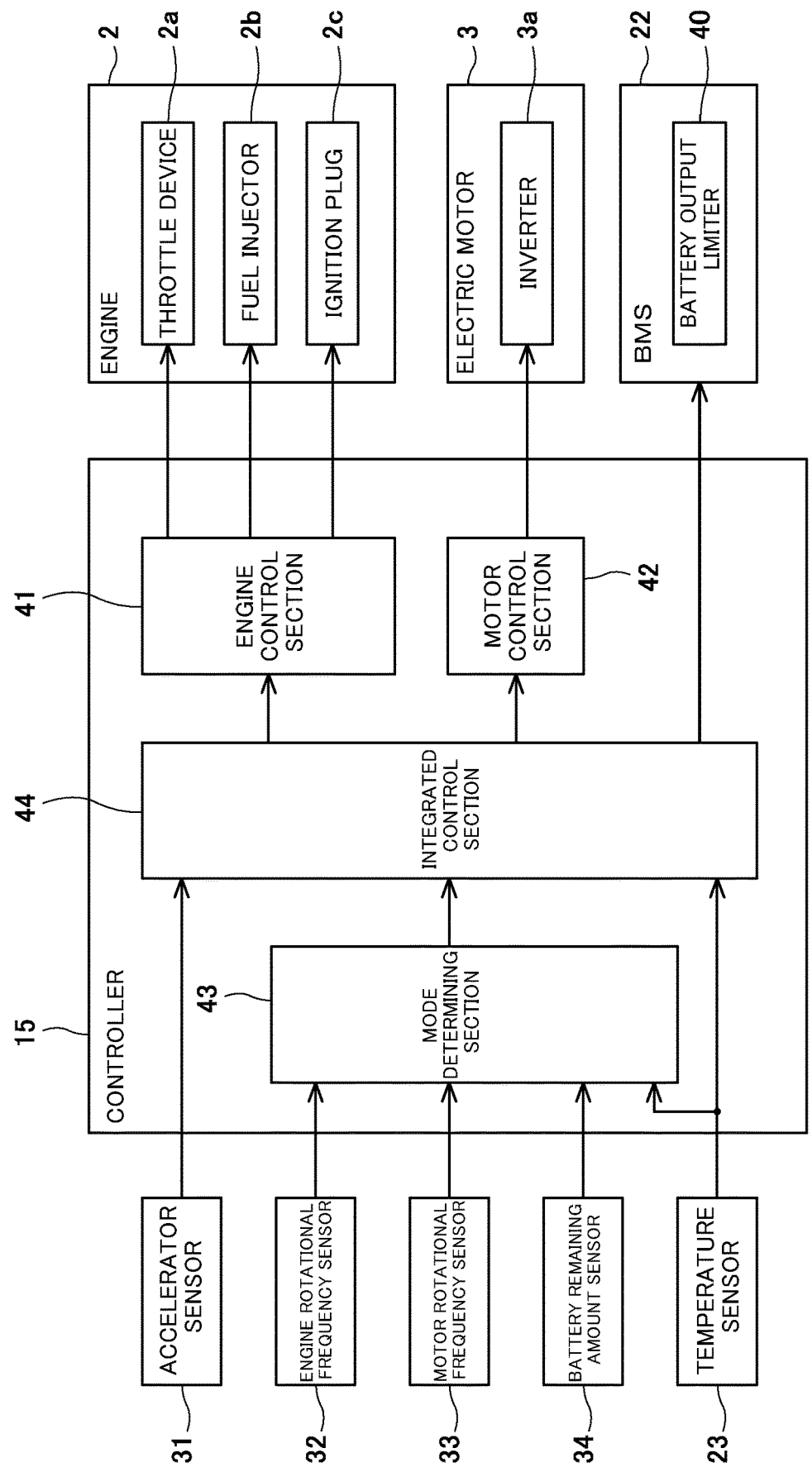
FIG. 3 is a block diagram of a controller of FIG. 1.

FIG. 3 is a block diagram of the controller 15 of FIG. 1. As shown in FIG. 3, an accelerator sensor 31, an engine rotational frequency sensor 32, a motor rotational frequency sensor 33, a battery remaining amount sensor 34, the temperature sensor 23, and the like are electrically connected to an input side of the controller 15. A throttle device 2a, a fuel injector 2b, an ignition plug 2c, the inverter 3a, the BMS 22, and the like are electrically connected to an output side of the controller 15.

The accelerator sensor 31 detects an accelerator manipulation amount (accelerator opening degree) of the rider. The engine rotational frequency sensor 32 detects the rotational frequency of the engine 2. The motor rotational frequency sensor 33 detects the rotational frequency of the electric motor 3. The battery remaining amount sensor 34 detects the remaining amount of the battery 21 of the first battery device 9. For example, the battery remaining amount sensor 34 is incorporated in the BMS 22. As described above, the temperature sensor 23 detects the temperature of the battery 21.

The throttle device 2a includes: a throttle valve that adjusts an intake amount of the engine 2; and a throttle motor that drives the throttle valve to adjust a throttle opening degree. The fuel injector 2b injects fuel, stored in a fuel tank, to an intake passage of the engine 2. The ignition plug 2c ignites a fuel-air mixture of a combustion chamber of the engine 2. The inverter 3a is incorporated in the electric motor 3 but may be connected to the electric motor 3 from an outside. The BMS 22 includes a battery output limiter 40 that determines a maximum electric current with which charging and discharging of the battery 21 can be performed. The battery output limiter 40 may be disposed at the controller 15 instead of the BMS 22.

The controller 15 includes a processor, a memory, an I/O interface, and the like in terms of hardware. The memory includes a storage (for example, a hard disk and a flash memory) and a main memory (RAM). The storage stores programs for outputting control commands to the engine 2, the electric motor 3, the BMS 22, and the like. The controller 15 includes an engine control section 41, a motor control section 42, a mode determining section 43, an integrated control section 44, and the like in terms of function. Each of the engine control section 41, the motor control section 42, the mode determining section 43, and the integrated control section 44 is realized in such a manner that the processor performs calculation processing of the program read out from the storage by the main memory.

The engine control section 41 controls the throttle device 2a, the fuel injector 2b, and the ignition plug 2c to control the engine E. The motor control section 42 controls the inverter 3a to control the electric motor 3. In accordance with signals from the engine rotational frequency sensor 32, the motor rotational frequency sensor 33, the battery remaining amount sensor 34, and the temperature sensor 23, the mode determining section 43 determines the driving mode to be executed. Details of a method of determining the driving mode will be described later.

The integrated control section 44 calculates the requested torque based on, for example, the accelerator manipulation amount detected by the accelerator sensor 31. The integrated control section 44 calculates the distribution of the requested torque with respect to the engine 2 and the electric motor 3 based on the driving mode determined by the mode determining section 43. Based on the requested torque and the distribution calculated as above, the integrated control section 44 commands the torque requested for the engine 2 to the engine control section 41 and commands the torque requested for the electric motor 3 to the motor control section 42. Based on the battery temperature detected by the temperature sensor 23, the integrated control section 44 transmits a control signal for driving the switch driver 26 to the BMS 22. The determination regarding whether to drive the switch driver 26 based on the temperature of the battery 21 may be performed by the BMS 22, not by the controller 15.

Figure 4:
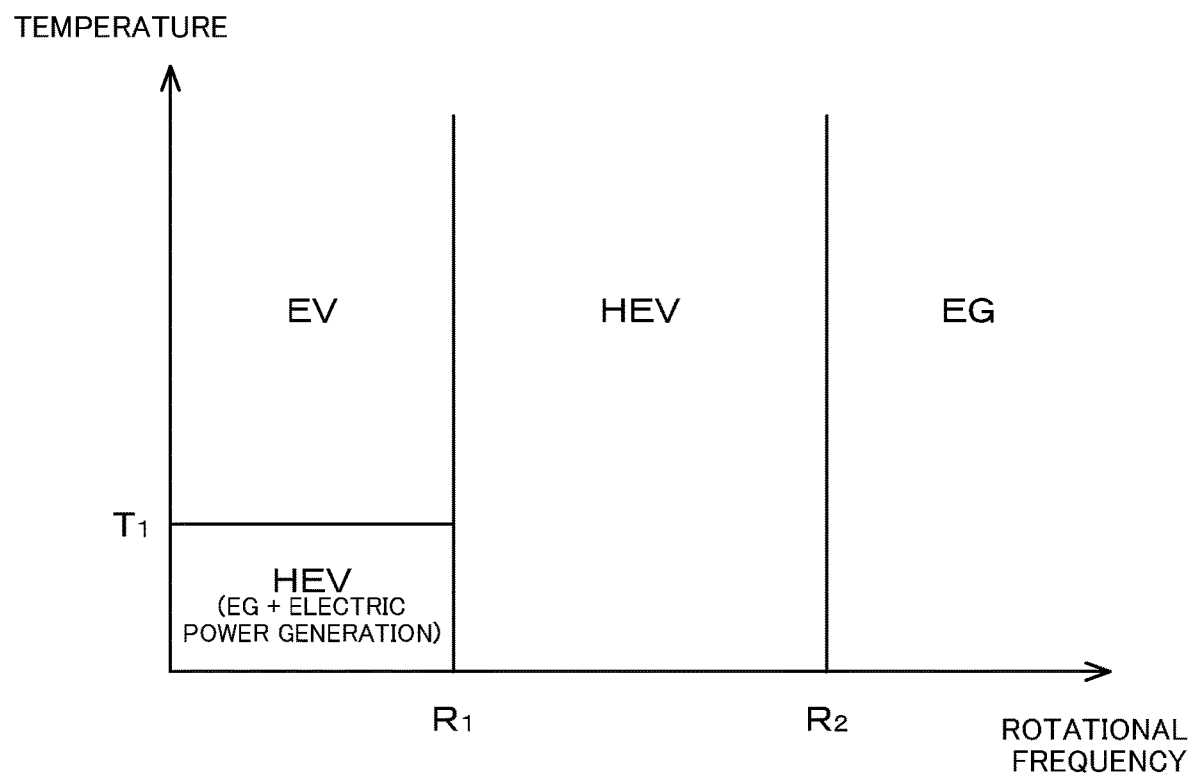
FIG. 4 is a diagram for explaining a switching condition of a driving mode in control of the controller of FIG. 3.

FIG. 4 is a diagram for explaining a switching condition of the driving mode in the control of the controller 15 of FIG. 3. As shown in FIGS. 3 and 4, the mode determining section 43 determines the driving mode of the hybrid vehicle 1 in accordance with the rotational frequency of the input shaft 4a of the transmission 4. The rotational frequency of the input shaft 4a may be calculated from the rotational frequency of the engine 2 and/or the rotational frequency of the electric motor 3. The engine 2 is efficient at an intermediate rotational frequency and a high rotational frequency, and the electric motor 3 is efficient at a low rotational frequency and an intermediate rotational frequency. Therefore, the mode determining section 43 determines the driving mode such that an efficient region of the engine 2 and an efficient region of the electric motor 3 are preferentially utilized.

Specifically, the mode determining section 43 sets the EV mode at the start of the traveling. As the rotational frequency of the input shaft 4a increases, the mode determining section 43 changes the mode in order of the EV mode, the HEV mode, and the EG mode. To be specific, the EV mode is set in a period from when the electric motor 3 is started up until when the rotational frequency of the input shaft 4a reaches a value $R_1$. The HEV mode is set until the rotational frequency of the input shaft 4a reaches a value $R_2$. The EG mode is set when the rotational frequency of the input shaft 4a exceeds the value $R_2$. In other words, an EV mode condition includes a condition that the rotational frequency is less than the predetermined value $R_1$. An HEV mode condition includes a condition that the rotational frequency is the predetermined value $R_1$ or more and less than the predetermined value $R_2$. An EG mode condition includes a condition that the rotational frequency is the predetermined value $R_2$ or more.

The EV mode condition may be set based on a condition other than the rotational frequency. For example, the EV mode condition may be a condition that a vehicle speed is a predetermined value or less, a condition that the EV mode has been selected by the rider, or a condition that it has been determined that the traveling is performed in an engine traveling prohibited area. As above, the EV mode may be selected based on predetermined various conditions.

When the battery remaining amount detected by the battery remaining amount sensor 34 is less than a predetermined permissible value, the mode determining section 43 changes the driving mode so as to decrease the driving power of the electric motor 3 or so as not to drive the electric motor 3. For example, in a case where the battery remaining amount becomes less than the permissible value when the EV mode condition is satisfied, the mode determining section 43 may change the mode from the EV mode to the HEV mode or to the EG mode.

When the EV mode condition and a normal-temperature condition are satisfied, the mode determining section 43 determines the EV mode as the driving mode. However, when the EV mode condition and a low-temperature condition are satisfied, the mode determining section 43 determines the HEV mode as the driving mode. The normal-temperature condition includes a condition that the battery temperature detected by the temperature sensor 23 is the threshold $T_1$ (for example, a value selected from a range of −10° C. to 10° C.) or more. The low-temperature condition includes a condition that the battery temperature detected by the temperature sensor 23 is less than the threshold $T_1$. For example, from the viewpoint of the protection (deterioration prevention) of the battery 21, the threshold $T_1$ set in the low-temperature condition may be set to a value that is substantially equal to a temperature at which electric current that can be made to flow from the battery 21 is restricted.

With this, in a case where the low-temperature condition is satisfied even when the EV mode condition is satisfied, the electric motor 3 consumes the electric power of the battery 21 by the HEV mode (i.e., electric current flows through the battery 21), and the battery 21 generates heat. Then, in a case where a state where the low-temperature condition is satisfied is changed to a state where the normal-temperature condition is satisfied (in a case where the battery temperature detected by the temperature sensor 23 becomes the threshold $T_1$ or more) while the EV mode condition is satisfied, the mode returns to the EV mode (normal driving mode). The threshold $T_1$ used to switch the driving mode may have hysteresis in order to prevent a case where the mode switching is repeatedly performed in a short period of time. To be specific, the threshold $T_1$ when the EV mode is switched to the HEV mode may be different from the threshold $T_1$ when the low-temperature condition is satisfied in the HEV mode, and therefore, the HEV mode returns to the EV mode again. In the present embodiment, the threshold $T_1$ when the HEV mode returns to the EV mode is smaller in value than the threshold $T_1$ when the EV mode is switched to the HEV mode.

When the normal-temperature condition is satisfied, the battery output limiter 40 sets the maximum electric current with which the charging and discharging of the battery 21 can be performed, to a predetermined normal temperature restriction value. However, when the low-temperature condition is satisfied, the battery output limiter 40 sets the maximum electric current with which the charging and discharging of the battery 21 can be performed, to a low temperature restriction value. The low temperature restriction value is a temperature lower than the normal temperature restriction value. When the temperature of the battery 21 is low, a discharge amount of the battery 21 is significantly restricted, and therefore, the driving of the electric motor 3 is also restricted.

When the EV mode condition and the low-temperature condition are satisfied, the integrated control section 44 commands the engine control section 41 and the motor control section 42 such that the driving power output by the engine 2 becomes larger than the driving power output by the electric motor 3 in the HEV mode. To be specific, the driving wheel 8 is driven mainly by the driving power from the engine 2, and the driving power of the electric motor 3 is made small. With this, while the electric current during the discharging of the battery 21 is maintained less than the low temperature restriction value, the temperature of the battery 21 increases by the discharging.

When the low-temperature condition is satisfied, the integrated control section 44 may control the electric motor 3 and the engine 2 such that: the maximum current value with which the charging and discharging of the battery 21 is performed is maintained less than the low temperature restriction value; and the electric current flowing through the electric motor 3 is larger than that when the normal-temperature condition is satisfied under the same conditions other than the temperature, and the HEV mode is set. With this, the heat generation of the first battery device 9 can be easily promoted.

When the EV mode condition and the low-temperature condition are satisfied, the mode determining section 43 may determine an EG power generation mode as the driving mode instead of the HEV mode, the EG power generation mode being a mode in which the engine 2 is set to a driving state, and the electric motor 3 is set to an electric power generating state. To be specific, in the EG power generation mode, in a state where electric current flows between the battery 21 and the electric motor 3, the electric motor 3 operates, and the engine 2 drives. To be specific, mechanical energy generated by the driving of the engine 2 is converted into electric energy by the electric motor 3, and the electric energy is stored in the battery. Specifically, with the transmission 4 in a neutral state, the controller 15 controls the clutch actuator 6 to set the main clutch 5 to the engaged state. With this, the power of the engine 2 is transmitted to the electric motor 3 without being transmitted to the driving wheel 8.

When the EV mode condition and the low-temperature condition are satisfied, the mode determining section 43 may alternately select the HEV mode and the EG power generation mode as the driving mode. For example, when the EV mode condition and the low-temperature condition are satisfied, the mode determining section 43 may select the HEV mode at the time of acceleration and select the EG power generation mode at the time of deceleration. With this, both accelerating performance and energy saving performance can be improved.

In accordance with the battery remaining amount detected by the battery remaining amount sensor 34, the mode determining section 43 may select whether to prioritize the discharging of the battery 21 or prioritize the charging of the battery 21. With this, at the time of the cold start, the temperature of the battery 21 can be increased while preventing a decrease in the remaining amount of the battery. For example, when the battery remaining amount detected by the battery remaining amount sensor 34 is a first remaining amount, the mode determining section 43 may determine the driving mode such that a time in which the EG power generation mode is being selected is longer than a time in which the HEV mode is being selected, as compared to when the battery remaining amount is a second remaining amount larger than the first remaining amount under the same conditions. For example, when the EV mode condition and the low-temperature condition are satisfied, and the battery remaining amount is larger than a predetermined value, the mode determining section 43 may select the HEV mode (in which the motor is utilized as the driving power source). Moreover, when the EV mode condition and the low-temperature condition are satisfied, and the battery remaining amount is less than the predetermined value, the mode determining section 43 may select the EG power generation mode (in which the motor is utilized as the electric power generator).

Moreover, when the remaining amount of the battery 21 is larger than a predetermined upper threshold, the HEV mode may be selected. When the remaining amount of the battery 21 is smaller than a predetermined lower threshold, the EG power generation mode may be selected. In this case, in anticipation of the generation of a load by the electric power generation of the electric motor 3, the output of the engine 2 may be set to be higher than the output of the engine 2 when the normal-temperature condition is satisfied under the same conditions other than the temperature, and the HEV mode is set. Moreover, when the remaining amount of the battery 21 falls within a range between the upper threshold and the lower threshold, the electric motor 3 may be set to the driving state at the time of the traveling and may be set to the electric power generating state at the time of braking or at the time of the stop state. Thus, the opportunity to make electric current flow through the battery 21 and the amount of electric current flowing through the battery 21 may be increased, and the amount of electric current in the low-temperature state may be made larger than that in the normal-temperature state.

In the example of FIG. 4, when the battery temperature detected by the temperature sensor 23 is less than the threshold $T_1$, electric current is made to flow between the battery 21 and the electric motor 3. However, when the battery temperature is an extremely low temperature, i.e., when the battery temperature is less than a threshold $T_2$ (for example, a value selected from a range of −20° C. to 0° C.) lower than the threshold $T_1$, the mode determining section 43 may select the EG mode in which: electric current does not flow between the battery 21 and the electric motor 3; and the traveling is performed only by the driving power of the engine 2. In this case, when the temperature of the battery 21 is increased by the heat of the engine 2 and is not the extremely low temperature any more, i.e., when the battery temperature becomes the threshold $T_2$ or more, the mode determining section 43 may change the mode to the HEV mode or the EG power generation mode such that electric current flows between the battery 21 and the electric motor 3.

Moreover, as the battery temperature increases, the integrated control section 44 may increase an upper limit of a charge amount per unit time and an upper limit of a discharge amount per unit time. With this, a temperature increasing effect by self-heating of the battery 21 can be promoted. Furthermore, when the EV mode condition and the low-temperature condition are satisfied, the integrated control section 44 may promote the heat generation of the battery 21 by increasing the charge amount of electric power supplied from the first battery device 9 to the second battery device 13 as compared to when the EV mode condition and the normal-temperature condition are satisfied. Each of the upper limit of the charge amount per unit time and the upper limit of the discharge amount per unit time may be set so as to change stepwisely in accordance with the temperature increase or change continuously in proportion to the temperature increase.

Moreover, when the manual transmission is replaced with an automatic transmission as the transmission 4, and the low-temperature condition is satisfied, the controller 15 may control a speed change actuator of the transmission 4 so as to change a gear stage of the transmission 4 (to a low-speed stage (high reduction ratio), for example) such that the discharge amount of the battery 21 increases.

Moreover, the hybrid vehicle 1 may include an informing device that informs the rider of the operation of the low-temperature state when the low-temperature condition is satisfied. For example, a meter that is an instrument panel may serve as the informing device. Specifically, when performing control corresponding to the low-temperature condition, the integrated control section 44 gives a display command to the meter such that the meter displays the execution of the control corresponding to the low-temperature condition. With this, the rider can recognize the operation different from the operation of the normal-temperature state and therefore can be prevented from erroneously determining that a malfunction has occurred.

Moreover, when the EV mode condition and a predetermined inhibiting condition are satisfied although the low-temperature condition is satisfied, the EV mode may be set such that switching to the HEV mode is inhibited. For example, the inhibiting condition may be set based on a command from the rider, a vehicle body state, or an external environment. For example, the inhibiting condition may include at least one of: a condition that a request from the rider is detected; a condition that abnormality of the engine is detected; or a condition that the traveling in a region where the driving of the engine is inhibited is detected. In this case, unintended execution of the HEV mode can be inhibited, and convenience can be improved.

As another example, when it is assumed that the vehicle stops before the temperature of the first battery device 9 increases to exceed the threshold $T_1$, the EG power generation mode (the transmission 4 is set to a neutral state) may be set in the stop state, and electric current may be supplied from the electric motor 3 to the first battery device 9. With this, active electric power generation may be performed, and the temperature increase of the first battery device 9 may be performed. Moreover, in the present embodiment, the ISG 11 is used. Therefore, when the low-temperature condition is satisfied, an energization period of the ISG 11 may be made longer than that when the normal-temperature condition is satisfied, and electric current that flows during the energization of the ISG 11 may be made larger than that when the normal-temperature condition is satisfied. With this, the amount of electric current flowing through the battery 21 may be increased.

According to the above-described configuration, at the time of the cold start, while generating adequate traveling driving power by the driving of the engine 2, the temperature of the battery 21 can be increased by the generation of the flow of the electric current (discharging or charging) of the battery 21 by the operation of the electric motor 3, and this can promote the recovery of the discharge characteristic of the battery 21. Therefore, even at the time of the cold start, the state of the battery 21 can be quickly changed to the normal-temperature state while suppressing a deterioration of driving feeling.

Moreover, when the low-temperature condition is satisfied, the maximum electric current with which charging and discharging of the battery 21 can be performed is set to the low temperature restriction value by the battery output limiter 40. Therefore, while preventing the deterioration of the battery 21, the energization of the battery 21 can be performed. Thus, at the time of the cold start, the self-heating of the battery 21 can be performed within a range of output limitation of the battery 21.

Moreover, when the EV mode condition and the low-temperature condition are satisfied, the driving power of the electric motor 3 is set smaller than the driving power of the engine 2. In this case, at the time of the cold start, the traveling is performed by increasing the driving power of the engine 2. Thus, while suppressing a load on the battery 21 that is low in temperature, the adequate traveling driving power can be generated.

Moreover, in a case where the electric motor 3 is set to the electric power generating state when the EV mode condition and the low-temperature condition are satisfied, the battery 21 is charged with the electric power generated by the electric motor 3 at the time of the cold start. With this, the temperature of the battery 21 can be increased, and this can promote the recovery of the discharge characteristic of the battery 21.

Moreover, by heating the battery 21 with the heater 24 in addition to the discharging of the battery 21 by the driving of the electric motor 3, the temperature of the battery 21 is further effectively increased. Therefore, the discharge characteristic of the battery 21 can be quickly recovered at the time of the cold start. Moreover, even when the hybrid vehicle 1 is in the stop state, the temperature of the battery 21 can be easily increased by the heater 24. Furthermore, the electric power for driving the heater 24 is generated by the battery 21. With this, the temperature increase of the battery 21 can be realized by not only the heating of the battery 21 by the heater 24 but also the self-heating of the battery 21 by the energization of the battery 21.

A temperature threshold at which the switch driver 26 switches the switch 25 from the non-energized state to the energized state may be different from the threshold $T_1$. Moreover, the heater 24 may be omitted, and when the EV mode condition and the low-temperature condition are satisfied, the temperature increase of the battery 21 may be promoted by the heat generated by charging or discharging of the battery 21. In contrast, the temperature increase of the battery 21 may be promoted by the heater 24 without performing control in which when the EV mode condition and the low-temperature condition are satisfied, the HEV mode or the EG power generation mode is set as the driving mode.

Figure 5:
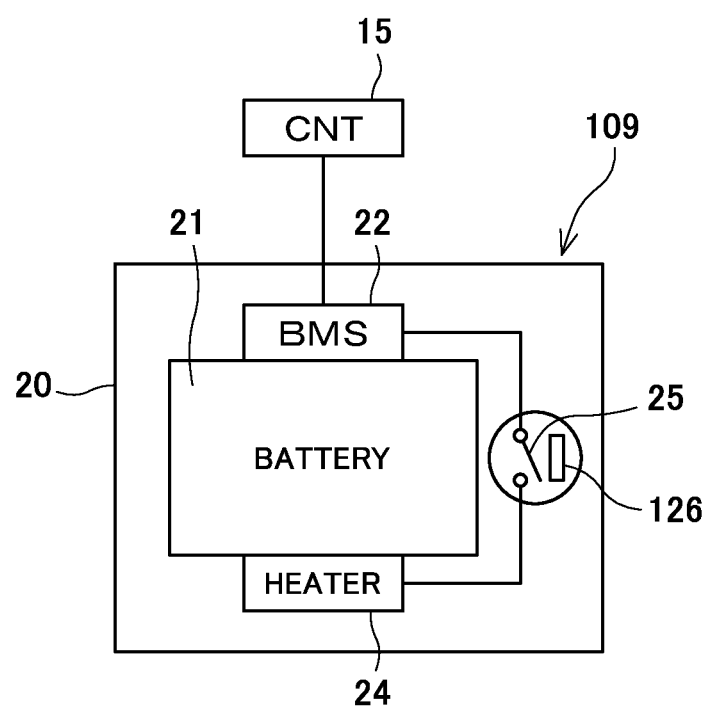
FIG. 5 is a schematic diagram of a first modified example of the first battery device of FIG. 1.

FIG. 5 is a schematic diagram of a first modified example of the first battery device 9 of FIG. 1. The same reference signs are used for the same components as in FIG. 2, and the repetition of the same explanation is avoided. As shown in FIG. 5, in a first battery device 109, a switch driver 126 is a heat sensitive body (for example, bimetal) having such a characteristic as to deform by a temperature change. To be specific, the switch driver 126 operates without electric power. When the normal-temperature condition is satisfied, the switch driver 126 separates from the switch 25 to realize the open state of the switch 25. When the low-temperature condition is satisfied, the switch driver 126 pushes the switch 25 to realize a closed state of the switch 25. With this, in a case where the low-temperature condition is satisfied even when the EV mode condition is satisfied, the battery 21 is heated by the energization of the heater 24. Therefore, the discharge characteristic of the battery 21 can be quickly recovered at the time of the cold start.

Figure 6A:
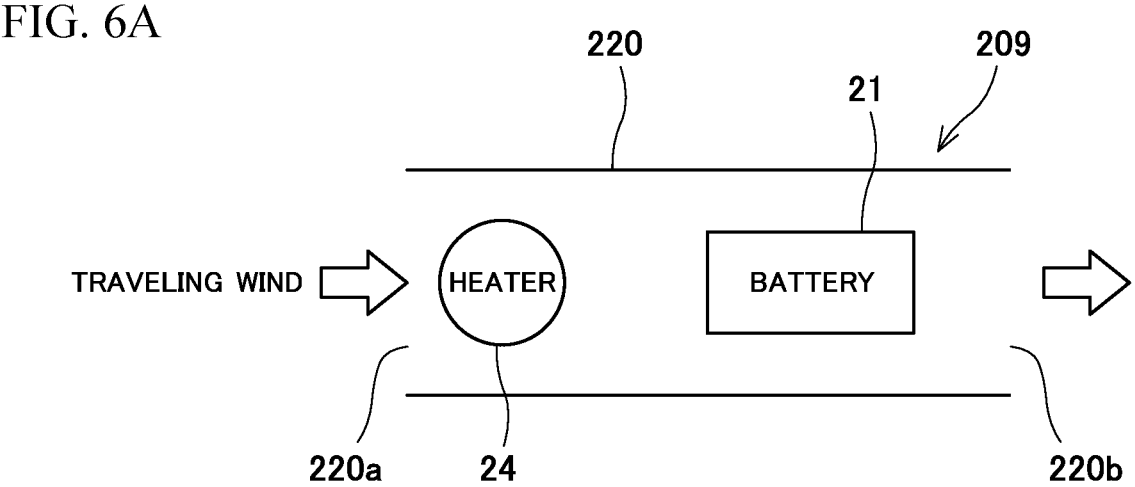
FIG. 6A is a schematic diagram of a second modified example of the first battery device of FIG. 1.

FIG. 6A is a schematic diagram of a second modified example of the first battery device 9 of FIG. 1. As shown in FIG. 6A, a first battery device 209 includes an air introducing duct through which traveling wind is introduced to the battery 21 to cool the battery 21 during traveling. In this example, a housing 220 that accommodates the battery 21 includes: an inflow opening 220a that is open forward; and an outflow opening 220b that is open rearward. The battery 21 is arranged between the inflow opening 220a and the outflow opening 220b. To be specific, the housing 220 also serves as the air introducing duct. When the normal-temperature condition is satisfied, the traveling wind introduced to the housing 220 cools the battery 21, and this prevents overheat of the battery 21.

The heater 24 is arranged in the housing 220 so as to be located between the inflow opening 220a and the battery 21. To be specific, the heater 24 is located upstream of the battery 21 in a direction in which the traveling wind flows. With this, when the low-temperature condition is satisfied, the traveling wind warmed by the heater 24 warms the entire battery 21, and therefore, the temperature increase of the entire battery 21 can be easily uniformized.

Figure 6B:
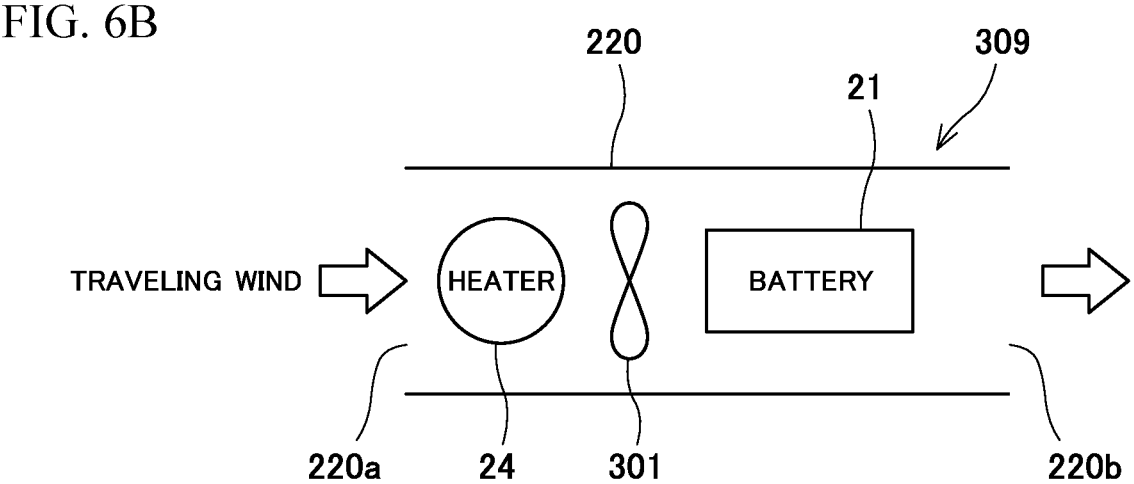
FIG. 6B is a schematic diagram of a third modified example of the first battery device of FIG. 1.

FIG. 6B is a schematic diagram of a third modified example of the first battery device 9 of FIG. 1. As shown in FIG. 6B, in a first battery device 309, a fan 301 is located downstream or upstream of the heater 24 in the direction in which the traveling wind flows. When the normal-temperature condition is satisfied, the inside of the housing 220 is ventilated by the driving of the fan 301 even during the stop state, and this prevents overheat of the battery 21. When the low-temperature condition is satisfied, the air warmed by the heater 24 can be forcibly introduced to the entire battery 21 even during the stop state.

The present disclosure is not limited to the above-described embodiment, and modifications, additions, and eliminations may be made with respect to the configuration of the embodiment. For example, some of components in an embodiment or a modified example may be separated and arbitrarily extracted from the other components in the embodiment or the modified example, and some of components in an embodiment or a modified example may be applied to another embodiment or another modified example. The above embodiment has described a parallel hybrid system as the system of the hybrid vehicle 1, but the system of the hybrid vehicle 1 may be a series hybrid system. Moreover, the configuration including the heater 24 that can heat the battery 21 is applicable to not only the hybrid vehicle but also a vehicle which does not include an engine but includes an electric motor as a driving power source.

The programs may be stored in a computer-readable medium. The computer-readable medium is a non-transitory, tangible medium. The computer-readable medium may be a storage medium that is incorporated in or externally attached to a computer (such as a mobile information terminal, a personal computer, or a server). The storage medium may be a RAM, a ROM, an EEPROM, and/or a storage. The storage medium may be, for example, a hard disk, a flash memory, and/or an optical disk. The program stored in the storage medium may be executed in a computer to which the storage medium is directly connected or may be executed in a computer to which the storage medium is connected through a network (for example, the Internet).

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A hybrid vehicle comprising:
a driving power source including an engine and an electric motor;
a battery that supplies electric power to the electric motor; and
a controller that controls the engine and the electric motor in accordance with a temperature of the battery,
wherein:
in response to determining that a predetermined EV mode condition is satisfied, and a normal-temperature condition that the temperature of the battery is a threshold or more is satisfied, the controller controls the driving power source in an EV mode in which the electric motor is driven; and
in response to determining that the EV mode condition is satisfied, and a low-temperature condition that the temperature of the battery is less than the threshold is satisfied, the controller controls the driving power source so as to operate the electric motor in a predetermined state where electric current flows between the battery and the electric motor and so as to drive the engine such that the engine generates traveling power transmitted to a driving wheel.

2. The hybrid vehicle according to claim 1, further comprising a battery output limiter that:
in response to determining that the normal-temperature condition is satisfied, sets maximum electric current with which charging and discharging of the battery is performed, to a predetermined normal temperature restriction value; and
in response to determining that the low-temperature condition is satisfied, sets the maximum electric current with which the charging and discharging of the battery is performed, to a low temperature restriction value smaller than the normal temperature restriction value.

3. The hybrid vehicle according to claim 1, wherein, in response to determining that the EV mode condition and the low-temperature condition are satisfied, the controller controls the driving power source such that driving power output by the engine becomes larger than driving power output by the electric motor.

4. The hybrid vehicle according to claim 1, wherein, in response to determining that the EV mode condition and the low-temperature condition are satisfied, the controller controls the driving power source such that the electric motor is set to an electric power generating state.

5. The hybrid vehicle according to claim 1, further comprising:
a heater that is in contact with the battery and generates heat with electric power from the battery to heat the battery;

a switch that switches a circuit between an energized state and a non-energized state, the circuit connecting the battery to the heater; and a switch driver that drives the switch such that the circuit is set to the energized state when the temperature of the battery is less than the threshold.

6. An electric vehicle comprising:

a driving power source including an electric motor;

a battery that supplies electric power to the electric motor;

a temperature sensor that detects a temperature of the battery;

a heater that is in contact with the battery and generates heat with the electric power from the battery to heat the battery;

a switch that switches a circuit between an energized state and a non-energized state, the circuit connecting the battery to the heater; and a switch driver that drives the switch such that the circuit is set to the energized state when the temperature of the battery is less than a threshold.

7. The hybrid vehicle according to claim 4, wherein, in response to determining the EV mode condition and the low-temperature condition are satisfied, the controller sets an EV-mode output of the engine to be higher than an HEV-mode output of the engine under a same set of conditions as in the EV mode, other than:

satisfaction of the normal-temperature condition; and setting of an HEV mode in which the electric motor and the engine are driven.

8. The hybrid vehicle according to claim 1, wherein the controller sets the electric motor to a driving state at a time of traveling and sets the electric motor to an electric power generating state at a time of braking or in a stopped state.

9. The hybrid vehicle according to claim 1, wherein:

the threshold is a first threshold;

when the temperature of the battery is less than the first threshold, the controller makes electric current to flow between the battery and the electric motor; and when the temperature of the battery is less than a second threshold lower than the first threshold, the controller selects an EG mode in which electric current does not flow between the battery and the electric motor and only a driving power of the engine is used for travelling.

10. The hybrid vehicle according to claim 1, further comprising an instrument panel that informs a rider of the operation of the predetermined state in response to determining the low-temperature condition is satisfied.

11. The hybrid vehicle according to claim 1, wherein, in response to determining the EV mode condition and the low-temperature condition are satisfied, the controller controls the driving power source such that the electric motor is set to a driving state that discharges the battery.

12. The hybrid vehicle according to claim 1, wherein, based at least in part on a battery remaining amount detected by a battery remaining amount sensor, the controller selects whether to prioritize discharging the battery or prioritize charging the battery.

13. The hybrid vehicle according to claim 5, wherein:

the heater is arranged in a duct via which airflow is introduced to the battery; and the heater is located between an inflow opening of the duct and the battery.

14. An electric vehicle comprising:

a driving power source including an electric motor;

a battery that supplies electric power to the electric motor;

a temperature sensor that detects a temperature of the battery;

a heater that generates heat with the electric power from the battery to heat the battery;

a switch that switches a circuit between an energized state and a non-energized state, the circuit connecting the battery to the heater; and a switch driver that drives the switch such that the circuit is set to the energized state when the temperature of the battery is less than a threshold, wherein:

the heater is arranged in a duct via which airflow is introduced to the battery; and the heater is located between an inflow opening of the duct and the battery.

* * * * *